Patented Dec. 30, 1941

2,268,123

UNITED STATES PATENT OFFICE 2,268,123

PROCESS OF MANUFACTURING COPPER ACETOARSENITE

Oswald Krefft, Hamburg, Germany, assignor, by mesne assignments, to Chemical Marketing Company Inc., New York, N. Y.

No Drawing. Application June 22, 1938, Serial No. 215,312. In Germany June 30, 1937

8 Claims. (Cl. 260—438)

The invention relates to the production of copper acetoarsenite $Cu(CH_3COO)_2.3Cu(AsO_2)_2$, especially as it is used for insecticides and fungicides.

When reacting copper acetate with arsenic oxide, acetic acid is set free. This free acetic acid causes strong corrosions and, as the process is generally carried through at elevated temperatures, the loss of acetic acid is hardly obviated.

It is an object of the invention to provide a process which permits to manufacture a copper acetoarsenite with high brilliancy and practical theoretical composition.

It is a further object of the invention to carry through this process without the production of free acetic acid thereby obtaining, after filtering the precipitate, liquors which may be readily used in dissolving crude copper materials in order to form the solutions wanted for the conversion. It is therefore an essential advantage of the present invention to provide a cyclic process for the production of copper acetoarsenite which is easily controlled and where only the constituents, as copper or copper-oxide, arsenious acid and acetic acid are added in the measure as they are precipitated in the form of copper acetoarsenite. Finally the process according to the invention distinguishes from prior art by the simplicity of the apparatus wanted.

It has been found that even in an alkaline or nearly neutral medium it is possible to precipitate nearly quantitatively copper acetoarsenite if, according to the invention, copper ammino acetate is caused to react with solid arsenious acid, according to the following equation:

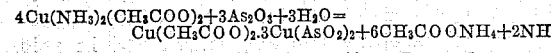

In carrying out the invention I produce an aqueous solution which contains cupriamminoacetate in any known manner, heat the solution and add the solid fine powder of arsenic trioxide, while stirring. The precipitate formed is filtered off. I take care to add only such quantities of arsenious acid, that the acetic acid set free is entirely neutralized by the ammonia present, so that no free acid is formed.

In the preferred manner, I use all the copper wanted for forming copper acetoarsenite when reacting with arsenious acid, in the form of copper amminoacetate. In that case, by the conversion, ammonia is set free, which after the reaction is neutralized by adding acetic acid. The quantity of acetic acid wanted therefore is exactly the same which is bound by the precipitate of copper acetoarsenite. After filtering off the precipitate, I contact the liquor with copper in the presence of oxygen, or air, or with copper oxide, so that in the solution copper-ammino-acetate be formed. This regenerated solution is used again for reacting with arsenious acid. It is a surprising fact, that the liquor, which contains small quantities of arsenious salts, can readily be used for redissolving copper materials.

It has been found advantageous to use an excess of copper salt at the conversion. The excess copper acetate or copper ammino acetate binds the ammonia set free during the reaction so that no loss of ammonia by evaporating is noticed. I prefer to take a proportion of at least 5 mol dissolved copper to 3 mol arsenious acid. In case of using all the copper present in the form of copperdiammino-acetate, the excess of copper-diammino-acetate is wholly or partly converted to copper tetrammino-acetate. By these measures a cyclic process becomes most simple. It is only necessary to add before or after the reaction the quantity of acetic acid contained in the precipitate of copper acetoarsenite, and, after filtering off the precipitate, to contact the liquor in a tower or the like with copper in the presence of oxygen or air or with copper oxide and finally to add to the heated solution the arsenious acid in quantities according to the invention. The volumes of the liquors are not to be changed and any troublesome neutralisation or correction is superfluous.

Example

In a tower over 75 kg. small copper wire pieces, an aqueous solution, made by dissolving neutral ammonium acetate in water so that the solution contains 10.85% $NH_3$ as ammonium acetate ($NH_4CH_3COO$), slowly flows down, in countercurrent to air streaming upwards, whereby care is taken that no free $NH_3$ is carried away. The treatment is continued till the solution contains 7.5% Cu and 9.02% $NH_3$.

After passing a sieve and a filtering cloth 498 l. of this solution which contains 36.5 kg. Cu is heated to 95° in a precipitating pot, whilst 55 kg. of finely powdered arsenious acid are introduced by and by. The operation is continued whilst stirring for two hours, whereafter 98 kg. of a precipitate are filtered off, which contains 55.95% $As_2O_3$ and 31.4% CuO. To the mother liquor 12.5 kg. acetic acid, which had been bound by the precipitate, are added. Thereafter the liquor is carried back to the tower in order to dissolve the copper as copper diamminoacetate. When used for the second time the solution of 34.5 kg. Cu was converted with 56 kg. arsenious acid whereby 98 kg. copperacetoarsenite containing 55.45% $As_2O_3$, 31.24% Cu and 11.5% acetic acid, were obtained.

It may be understood that the acetic acid which is bound by the copper-aceto-arsenite may also be added to the solution before the conversion with arsenious acid. In this case it is essential that a sufficient excess of copperamminoacetate is present, so that no acidification of the medium during the conversion occurs.

I claim:

1. The process of producing copper acetoarsenite which comprises reacting an excess of copper ammino-acetate with solid arsenious acid in an aqueous alkaline medium to form copper acetoarsenite without formation of free acetic acid.

2. The process of manufacturing copper acetoarsenite which comprises causing a solution of copper diamminoacetate to react with not more than a stoichiometric proportion of arsenious acid to form copper acetoarsenite substantially free of acetic acid, filtering the thus-formed copper acetoarsenite, adding to the filtrate an amount of acetic acid approximately equal to the quantity of acetic acid which has been bound by the precipitated copper acetoarsenite, contacting said filtrate in the presence of oxygen with a copper-containing material soluble in ammonium acetate to form a solution containing copper diaminoacetate, and causing this solution to react again with arsenious acid.

3. The process of manufacturing copper acetoarsenite comprising establishing a pool of copper amminoacetate, heating said pool of copper amminoacetate to about 95° C., adding solid arsenious acid thereto in an amount no larger than required for conversion of said copper aminoacetate to copper acetoarsenite whereby copper acetoarsenite is produced substantially devoid of free acetic acid, filtering the thus-formed copper acetoarsenite, adding to said filtrate an amount of acetic acid approximately equal to the amount which is bound as copper acetoarsenite upon the conversion of the copper aminoacetate to copper acetoarsenite by reaction with solid arsenious acid, contacting the filtrate with copper in the presence of oxygen to form copper aminoacetate, and causing this solution to react again with arsenious acid.

4. In the process of producing copper acetoarsenite by reacting a solution of ammonium acetate with copper to form a copper-containing solution and reacting said copper-containing solution with solid arsenious acid to form copper acetoarsenite, the improvement which comprises carrying out said reactions in an aqueous alkaline medium whereby copper acetoarsenite of high brilliancy is produced without substantial formation of free acetic acid.

5. In the process of producing copper acetoarsenite by reacting a solution of ammonium acetate with metallic copper in the presence of an oxygen-containing gas to form a copper-containing solution and reacting said copper-containing solution with solid arsenious acid to form copper acetoarsenite, the improvement which comprises reacting said copper-containing solution with no more than a stoichiometric quantity of arsenious acid in an aqueous slightly alkaline medium whereby copper acetoarsenite of high brilliancy is produced without substantial formation of free acetic acid.

6. In the process of producing copper acetoarsenite by reacting a solution of ammonium acetate with metallic copper in the presence of an oxygen-containing gas to form a copper-containing solution and reacting said copper-containing solution with solid arsenious acid to form copper acetoarsenite, the improvement which comprises reacting said copper-containing solution in an aqueous alkaline medium with such quantities of solid arsenious acid as are required by the amount of copper in the copper-containing solution for forming copper acetoarsenite, whereby acetic acid liberated by the reaction is neutralized by ammonia, thereby producing copper acetoarsenite of high brilliancy without substantial formation of free acetic acid.

7. In the process of producing copper acetoarsenite by reacting a solution of ammonium acetate with copper to form a copper-containing solution and reacting said copper-containing solution with solid arsenious acid to form copper acetoarsenite, the improvement which comprises employing a high concentration of ammonium acetate for reaction with the copper whereby an aqueous alkaline medium is obtained and copper diaminoacetate is produced, and adding only such quantities of solid arsenious acid as are required by the amount of copper in the copper diaminoacetate for forming copper acetoarsenite, whereby acetic acid liberated by the reaction is neutralized by ammonia, thereby producing copper acetoarsenite of high brilliancy without substantial formation of free acetic acid.

8. In the process of producing copper acetoarsenite by establishing a pool of a copper-containing acetate solution, slowly adding thereto an amount of solid arsenious acid whilst maintaining said pool at a temperature of about 95° C. to form copper acetoarsenite, and separating said copper acetoarsenite therefrom, the improvement which comprises employing an aqueous solution of copper diaminoacetate as the copper-containing acetate solution established in said pool.

OSWALD KREFFT.